United States Patent [19]

Evans et al.

[11] Patent Number: 5,794,119

[45] Date of Patent: Aug. 11, 1998

[54] SUBSCRIBER FREQUENCY CONTROL SYSTEM AND METHOD IN POINT-TO-MULTIPOINT RF COMMUNICATION SYSTEM

[75] Inventors: Allan Evans, Sunnyvale; Horen Chen, Saratoga, both of Calif.

[73] Assignee: Stanford Telecommunications, Inc., Sunnyvale, Calif.

[21] Appl. No.: 599,406

[22] Filed: Nov. 21, 1995

[51] Int. Cl.$^6$ ............................ H04B 1/00; H04N 7/173

[52] U.S. Cl. ................ 455/6.2; 455/71; 455/76; 348/11

[58] Field of Search ................ 348/10, 11, 12, 348/13, 7, 6, 14, 17; 455/3.2, 5.1, 6.2, 6.3, 86, 85, 87, 75, 76, 412; 375/344; H04N 7/16, 7/173, 7/20

[56] References Cited

U.S. PATENT DOCUMENTS

| | | | |
|---|---|---|---|
| 4,489,413 | 12/1984 | Richmond et al. | 370/30 |
| 4,932,070 | 6/1990 | Waters et al. | 455/10 |
| 5,134,707 | 7/1992 | Sakashita et al. | 455/3.2 |
| 5,230,088 | 7/1993 | Kramer, Jr. et al. | 455/76 |
| 5,249,305 | 9/1993 | Wieczorek | 455/76 |
| 5,280,644 | 1/1994 | Vannatta et al. | 455/265 |
| 5,542,095 | 7/1996 | Petranovich | 455/76 |

*Primary Examiner*—Chris Grant
*Attorney, Agent, or Firm*—Jim Zegeer, Esq.

[57] ABSTRACT

A frequency control system and method for minimizing frequency drifts in subscriber terminals in a point-to-multipoint system is described enabling the use of low cost oscillators in the Subscriber terminals by measuring the frequency offset of the subscriber terminal's receiver to estimate its oscillator frequency drift which is then used to correct the subscriber terminal's transmitter frequency and also by feedback of a frequency correction from the base station to the subscriber.

5 Claims, 3 Drawing Sheets

SUBSCRIBER FREQUENCY CONTROL SYSTEM AND METHOD IN POINT-TO-MULTIPOINT RF COMMUNICATION SYSTEM

BACKGROUND OF THE INVENTION

The demand for greater quantities of information and data transfer to and from residential, business and other users continues to grow faster than supply can keep up with it. This information demand is being supplied in a variety of forms comprising of telephone systems of various forms, cable systems, hybrid fiber/cable systems, and wireless systems. Local Multi-point Distribution System (LMDS) and Multichannel Multipoint Distribution Service (MMDS) provide such one way and two way broadband services as broadcast video, video-on-demand, multimedia capability, interactive video, high speed remote LAN/Internet access, telephony, telecomputing, speed learning, video conferencing, electronic sales/marketing, telemedicine, home shopping and high speed computer data links as examples. Both systems can provide a wireless infrastructure to deliver broadband services from, for example, a local TELCO central office (CO), or a cable "Headend" facility. FIG. 1 illustrates such a system. The exemplary system comprises three basic components: a Headend facility, a system of base or hub stations, and a multitude or plurality of subscriber stations. The overall system is made up of a geographical structure of non-overlapping cells, wherein each geographical cell can have a large number of subscriber stations supported by one Base Station. A plurality of Base Stations are interfaced to a single Head-End.

As shown in FIG. 1, the Head End collects all signals to be distributed throughout the system thereby forming a star configuration. The Head End at the center of the star, the Base Stations surround the Head End and the subscribers surround their respective Base Stations. As Examples of signals collected, digital video may be gathered via satellite links, a telephone system interface may be provided via Class 5 switches, and/or high rate digital data networks may be interfaced via a high rate data switch. The data to/from the Head End is distributed to the system of local base stations each assigned to serve its geographical "cell" of subscriber stations.

In such point-to-multipoint systems, where a base station is receiving from multiple subscribers, it is efficacious to reduce the frequency uncertainty of the transmissions from the subscribers to the base station (heretofore called the upstream direction). For example in either burst time-division multiple access (TDMA) or frequency-division multiple access (FDMA) continuous mode , the frequency uncertainty of narrowband data transmissions may comprise multiple frequency channels, which could cause one Subscriber to interfere with another on an adjacent frequency channel. In order to avoid such inter-channel interference, a large unusable guard band is often required between adjacent frequency channels, leading to inefficient band use.

In burst mode (TDMA) broadband systems, the signals from subscribers must be acquired during each burst. In burst mode systems, each burst typically consists of a preamble for synchronization, the actual data, and a guard band. A measure of efficiency of the channel is the proportion of data to the total burst length. The larger the frequency uncertainty of the subscriber transmissions as compared to the modulation symbol rate, the longer must be the synchronization preamble at the beginning of a burst, reducing the efficiency of the channel. For a given subscriber local oscillator stability, typically around 10 parts per million (ppm) for low cost oscillators, the amount of subscriber transmission frequency error is proportional to the carrier radio frequency (RF). As a result, this problem becomes particularly acute at the higher frequency bands currently being made available for these services-the ultra high frequency (UHF) (0.3–3 GHz), super high frequency (SHF) (3–30 GHz) and extremely high frequency band (EHF) (30–300 GHz). At 10 ppm, the corresponding carrier frequency errors are 3–30 KHz, 30–300 KHz and 300–3,000 KHz for UHF, SHF, and EHF respectively. The invention is especially useful in providing a low cost solution to solve subscriber frequency error problems in the 0.3–300 GHz range.

Typically, this problem is solved by ensuring that the frequency stability, measured in parts per million of the reference oscillators in the subscriber terminals is arbitrarily small. This results in the use of expensive oscillators which have special aging characteristics or use thermistor networks or electrically heated ovens to compensate for temperature-induced frequency drift. These solutions are orders of magnitude more expensive than desired for low cost consumer telecommunications equipment.

Another solution using inexpensive crystal oscillators is to slave the transmitter local oscillator to the receiver local oscillator via a phase-locked-loop M/N frequency synthesizer where M/N is the proportion of the transmitter frequency to the receiver frequency. This is undesirable because receiver thermal noise within the receiver carrier recovery phase looked loop causes phase noise on the transmitter local oscillator, resulting in excessive phase noise received at the head-end and hence a degradation or a lower bit-error-rate performance. In order to reduce the phase noise of the transmitter local oscillator, the noise bandwidth of the receiver phase locked loop must be made arbitrarily small, which reduces the ability of the receiver phase locked loop to track phase noise on the received signal causing a degradation in the subscriber bit error rate performance.

The object of the invention is to provide a low cost frequency control system which ensures that the frequency uncertainty of subscriber transmissions is made arbitrarily small with inexpensive crystal oscillators, without sacrificing bit error rate performance as a result of excessive phase noise.

BRIEF SUMMARY OF THE INVENTION

The invention is a frequency control system and method which utilizes an estimate of receiver frequency offset to derive an estimate of the frequency drift of the reference oscillator to compensate the frequency offset on the transmitter local oscillator. This allows the use of low cost crystal oscillators in subscriber telecommunications equipment without causing a degradation in bit error rate performance at either the base station or the subscriber terminal.

The invention provides a unique and useful frequency control in a terrestrial point-to-multipoint communication systems such as MMDS and LMDS operating in the 0.3–300 GHz band whereby subscriber terminal's transmitter local oscillator error is reduced either or both of the following techniques:

1. Use of a reference broadcast signal of high frequency precision from the base station and an estimate obtained from measuring the frequency error in the subscriber receiver to compensate for frequency drift/ error in the subscriber transmitter local oscillator; and/ or 2. Individual estimate obtained from measuring each subscriber's frequency error in the base station receiver carrier recovery and relayed to the corresponding subscriber transmitter's local oscillator.

DESCRIPTION OF THE DRAWINGS

The above and other objects, advantages and features of the invention will become more apparent when considered with the following specification and accompanying drawings, wherein.

DESCRIPTION OF SPECIFIC EMBODIMENTS

Figure 1:
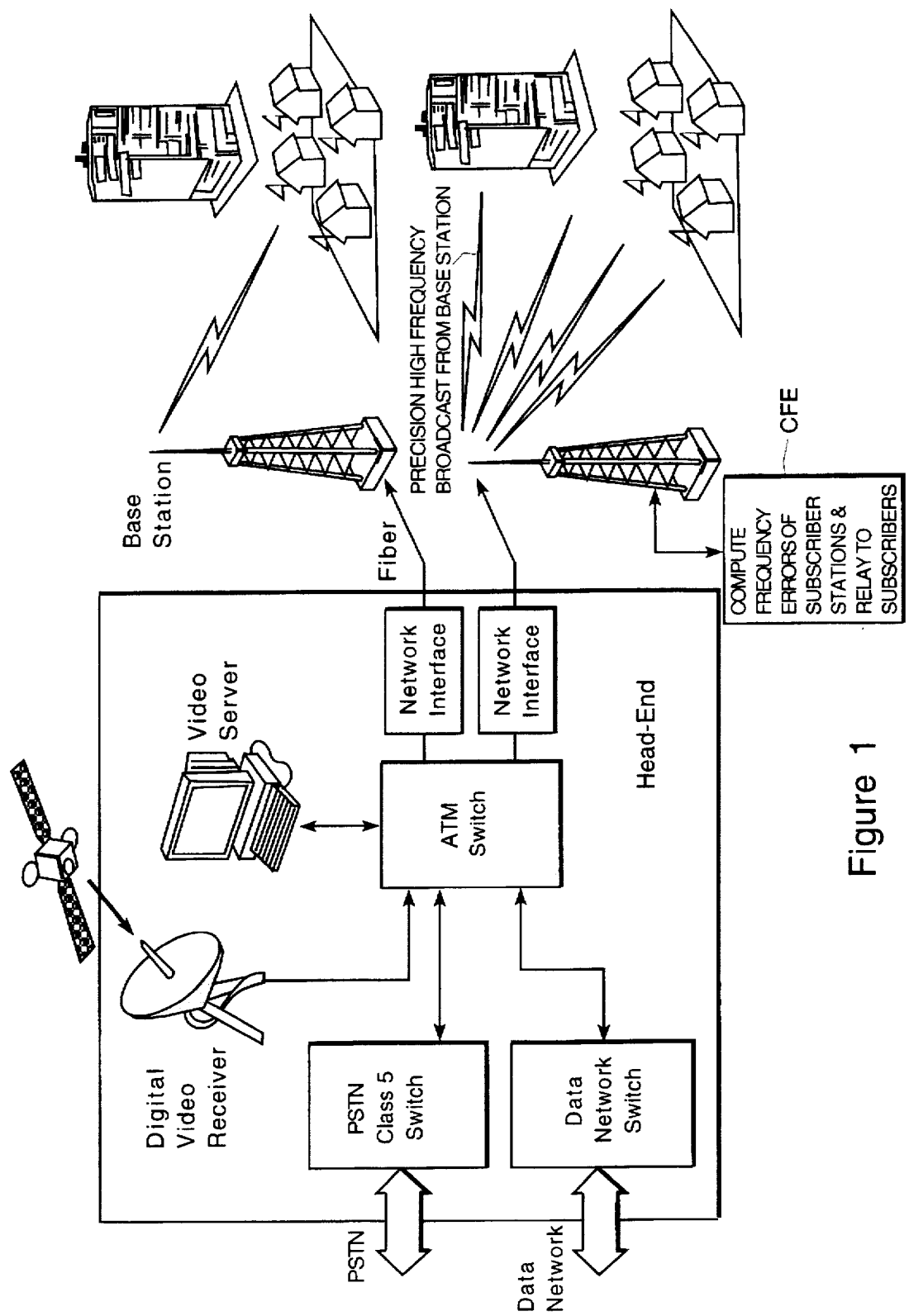
FIG. 1 is a schematic block diagram of a Local Multipoint Distribution System (LMDS) or Multichannel Multipoint Distribution Service (MMDS) incorporating the invention.
Figure 2:
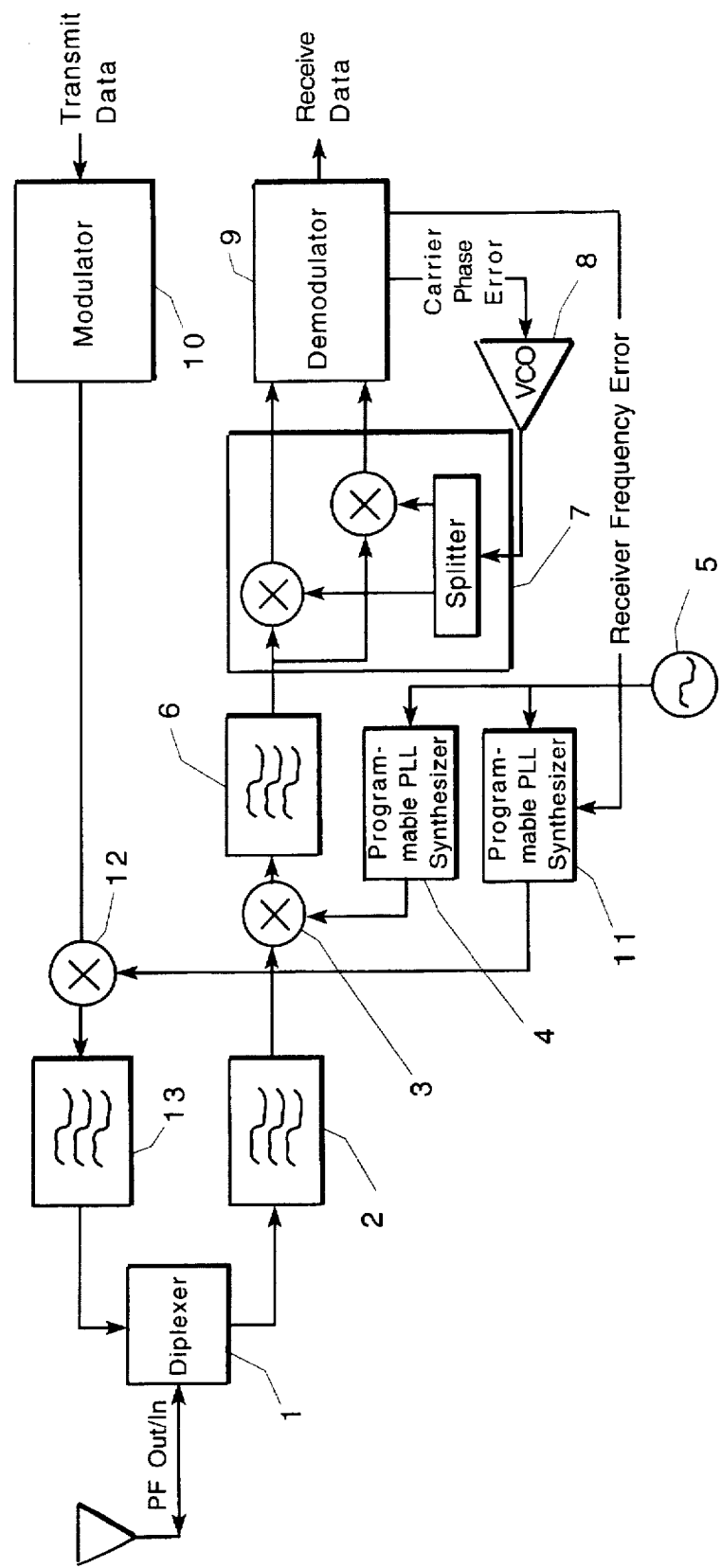
FIG. 2 is a block diagram of a subscriber frequency control system incorporating the invention.

An example subscriber terminal frequency control system is shown in FIG. 2. The RF input from the antenna is passed through the diplexer (1) to the image reject filter (2) which filters any signals which may be at the image frequency of $f_{LO}-f_{IF}$ for low side injection where $f_{LO}$ is the frequency of the receiver local oscillator and $f_{IF}$, is the intermediate frequency. The first receiver mixer stage (3) downconverts the input signal using the first receiver local oscillator (4) to an intermediate frequency. The first receiver local oscillator is synthesized from the crystal oscillator reference (5) via a phase locked loop synthesizer with a programmable prescaler to effect tuning. The image from the first receiver mixer at $f_{LO}+f_{RF}$ is removed by the first receiver mixer image filter (6) where $f_{RF}$ is the frequency of the original RF input. The quadrature downconverter stage (7) mixes the signal at the intermediate frequency to baseband in-phase and quadrature signals with a second receiver local oscillator derived from a voltage controlled oscillator (VCO) (8) that can then be demodulated by demodulator (9).

For coherent demodulation, the carrier phase will need to be recovered by typically closing a phased locked loop through the quadrature downconverter. Typically, this is done by feeding back a control voltage, derived from the phase error between the second receiver local oscillator and the input signal, to the voltage controlled oscillator (8). There are numerous methods for implementing the phase locked loop.

Figure 3:
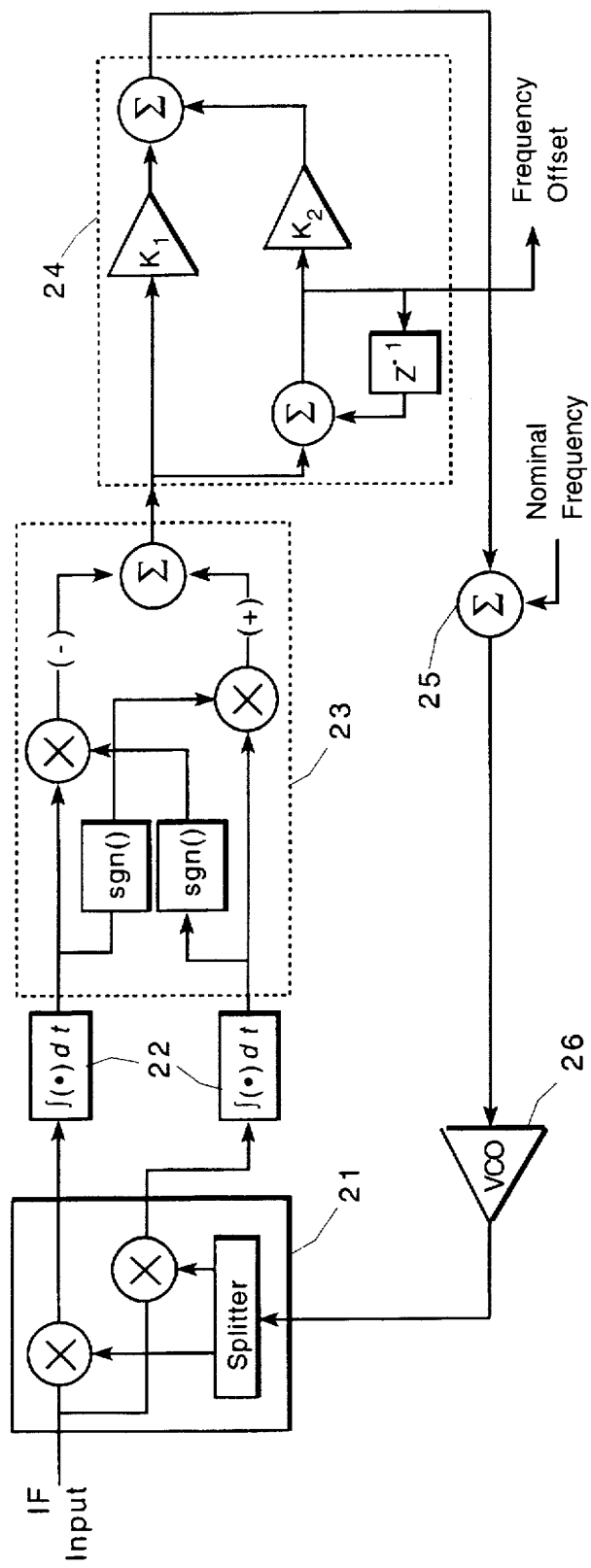
FIG. 3 is a block diagram of a digital phase locked loop architecture of the invention.

FIG. 3 shows, as an example, a digital phase locked loop implementation for quadrature phase shift keying (QPSK) type modulation , although the invention is equally applicable to other modulation techniques. As before, the quadrature downconverter (21) passes in-phase and quadrature baseband analog samples to matched filters (22) whose outputs are sampled on symbol epochs (not shown). A quadrature phase shift keyed decision-directed-phase detector (23) forms the phase error estimate which is filtered by the loop filter (24) to achieve the desired loop noise performance for demodulation. The output of the loop filter represents a frequency error which when added to the nominal frequency (25) represents the new frequency estimate which can be converted to a voltage suitable for controlling the voltage controlled oscillator (26).

After initial signal acquisition by the receiver, the transmit local oscillator will be immediately compensated for frequency drift in the reference crystal oscillator. Since the frequency reference in the base station will be orders of magnitude more stable than the reference crystal oscillator in the subscriber terminal, any measured frequency error in the subscriber carrier phase recovery can be assumed to be caused by the subscriber's reference crystal oscillator. After the initial frequency offset has been removed, the frequency error needs only to be updated periodically, perhaps once per minute, due to variations in ambient temperature. The slow nature of the frequency drift lends itself to software implementation by a low cost microcontroller.

Typically a QPSK demodulator digital integrated circuit will make available the frequency error. This can be taken from the accumulator of the loop filter as shown in FIG. 3, or the integrated circuit may employ a separate algorithm for estimating the frequency offset. The frequency error estimate could be read periodically by a microcontroller, microprocessor or digital signal processor and further processed in software to achieve the desired noise performance. The microcontroller, microprocessor, or digital signal processor could then adjust the prescale divider in the transmit phase locked loop synthesizer to remove the frequency error in the transient local oscillator (11, FIG. 2).

The invention is particularly appropriate where the upstream is in a burst mode, so that the control of the transmit local oscillator drift/error can be performed for all bursts from all subscribers and between transmission bursts of each subscriber. Generally speaking, the frequency adjustments can be made small enough so frequency step induced is much less than the loop bandwidth of the base station carrier recovery algorithm to avoid inducing cycle slips and bit errors in the base station demodulator. This small step adjustment is effective because of the slow nature of the frequency drift of the subscriber local oscillator.

An alternative technique that reduces the processing requirements of the subscriber terminal works as follows. The frequency error in each subscriber's transmission is computed by the base station in CFE and relayed back to each subscriber for transmit frequency correction or adjustment through a control channel or in-band signaling in the downstream data. This is potentially desirable in burst upstream systems where a single demodulator in the base station can service all subscribers in a frequency channel. In this configuration, each subscriber's transmit frequency error is computed from the error in the base stations carrier recovery algorithm.

VARIATIONS

A. Hardware Implementation

The processing of the frequency error estimate may also be performed completely in hardware without requiring intervention and software processing by a microcontroller, microprocessor, or digital signal processor. This, in effect, becomes a frequency locked loop where the transmitter local oscillator frequency is slaved to the receiver local oscillator frequency.

For some fortuitous combinations of modulation symbol rates and carrier recovery phase locked-loop bandwidths. It may be possible to coherently turnaround the recovered carrier on the transmitter local oscillator. This, in effect, results in a phase-locked loop where the transmitter local oscillator is slaved and phase locked to the receiver local oscillator.

B. Digital Implementations

The voltage, controlled oscillator can be replaced by an all digital numerically controlled oscillator in some digital implementations. Additionally, the transmitter local oscillator for RF upconversion may be fixed and the modulator itself could contain a numerically controlled oscillator to effect the frequency drift compensation and provide a variable intermediate frequency to the transmit mixer.

SUMMARY OF ADVANTAGES

By reducing frequency errors from all subscriber stations according to the invention, no excessive frequency bands are required between adjacent FDMA channels thereby improving spectrum usage. Moreover, by reducing frequency errors from all subscriber stations, rapid acquisition of each subscriber's signal can be achieved at the base station, thereby allowing efficient TDMA upstream operation.

While the invention has been described in relation to preferred embodiments, it will be appreciated that other embodiments, adaptations and modifications will be apparent to those skilled in the art.

What is claimed is:

1. In a radio communication system having at least one base station transmitting to and receiving RF communication signals from a plurality of associated subscriber stations in the 0.3–300 GigaHertz (GHz) range, the improvement comprising a system for reducing frequency uncertainty of RF transmissions from subscriber stations to said base station, said system including:

each of said subscriber stations having transceiver means with transmit and receive channels, a transmit mixer in said transmit channel and a receive mixer in said receive channel, a reference oscillator, controllable transmit and receive local frequency sources connected to said reference oscillator, first demodulator means, downconverter means connecting said first demodulator to said receiver mixer, voltage controlled oscillator means connected to said downconverter, means connecting said first demodulator means to said voltage controlled oscillator for supplying a carrier phase error correction signal to said voltage controlled oscillator, and means connecting said transmit frequency source to said first demodulator to adjust the frequency of said transmit frequency source.

2. The radio communication system defined in claim 1 wherein said reference oscillator is a crystal oscillator.

3. The radio communication system defined in claim 1 wherein said controllable transmit and receive local frequency sources are programmable phase locked loop frequency synthesizers.

4. The radio communication system defined in claim 1 wherein said downconverter is a quadrature downconverter.

5. The radio communication system defined in claim 1 including image reject filter means connecting said receive mixer to said downconverter.

* * * * *